July 29, 1941.    G. L. JONES ET AL    2,250,870
METHOD FOR WELDING RAILS
Original Filed Oct. 15, 1937    2 Sheets-Sheet 1

INVENTORS
G. LESTER JONES
CHARLES B. ROEDE
BY
Joseph H. Lipschutz
ATTORNEY

Patented July 29, 1941

2,250,870

UNITED STATES PATENT OFFICE 2,250,870

METHOD FOR WELDING RAILS

George Lester Jones, Garden City, N. Y., and Charles B. Roede, Ridgefield, N. J., assignors to Sperry Products, Inc., Hoboken, N. J., a corporation of New York Original application October 15, 1937, Serial No. 169,222. Divided and this application December 12, 1940, Serial No. 369,772

5 Claims. (Cl. 219—10)

This invention relates to a method for the mass production of welded rails and is a division of our copending application Serial No. 169,222, filed October 15, 1937. While welding of rails has been known for many years, it is only recently that the necessity for mass production has arisen, by reason of the fact that certain railroads have begun to adopt continuous rail as standard practice, and it is not possible by methods heretofore employed to weld substantially all of the rails in railroads of any length efficiently and economically. It is therefore the primary object of our invention to provide a method for economically and efficiently welding rails in large numbers on a mass production basis.

In the mass production of rail welds, it will be realized that standard rail lengths are continuously being fed into the welding mechanism to be welded end to end to form the welded rail lengths. One of the most serious problems which confronts those who attempt to weld rails on such a mass production basis is due to the fact that, although rails appear to be of constant cross-section, this is not actually the case. Due to the method by which rails are rolled, it is found that there is substantial variation in the cross-section of rails and unless unusual precautions are taken to match the rail sections it will be found that the rails are joined out of alignment with each other with parts projecting as much as ⅛ to ¼ of an inch, so that even after grinding, the continuity of the rail is seriously impaired. On the other hand, if time is taken to match up the sections so that they will be in alignment before welding takes place, then it is found that so much time is consumed as to seriously impair the economy of operation of the welding mechanism. It is therefore one of the principal objects of applicants' invention to provide a method whereby rails may be quickly placed in substantial alignment without adding to the total time consumed by the welding operation.

In the flash butt welding of rails by electric current, it has been found that unless the parts of the rail cross-sections are evenly heated there is a tendency, when the rails are butted together, for the part which has been less heated to be moved out of alignment because of the fact that the parts which have been more readily heated are capable of quicker fusion. It is therefore another object of our invention to provide a method which will ensure substantially uniform heating of the entire rail cross-section prior to the butting operation.

Further objects of our invention will become apparent in the following detailed description thereof.

In the accompanying drawings—

Figure 1:
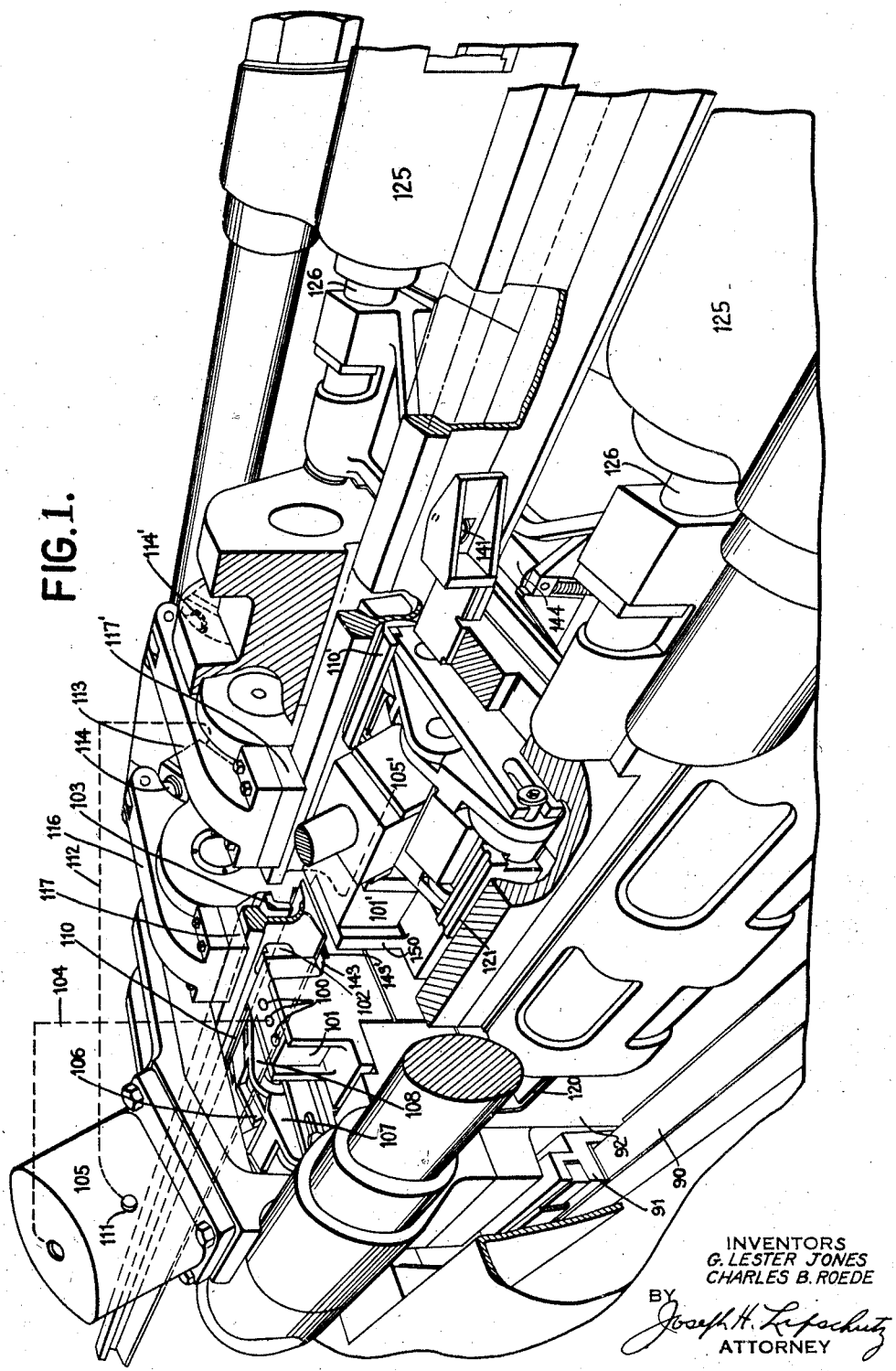
Fig. 1 is a perspective, with parts broken away and parts sectioned, of the welding machine.

The welding machine itself is disclosed in Figure 1 and comprises fixed guides 90 upon which the welding machine may be operated axially of the rail length. For this purpose the welding machine is provided with brackets 91 fixed to the main casting 92 of the welding machine so that the said welding machine may slide along the fixed slides 90. The various movements of the welding machine proper and the parts thereof are designed to be effected by fluid under pressure, preferably by oil under pressure. Not only does this longitudinal movement of the welding machine permit the machine to be moved relative to the rail ends, but it also permits the rail to be moved together with the machine by means of the clamping mechanism which causes the said rail end and machine to move integrally. Thus, if the rail end has moved too far through the welding machine it is possible for the welding machine to grip the said rail and by reason of the oil pressure system just described to move the rail back into welding position. When the first rail has been moved to welding position with its leading end projecting out of the welding machine and the right-hand end in welding position, the operator operates a valve (not shown here, but fully disclosed in the said parent application Ser. No. 169,222) to admit fluid under pressure by way of fluid pressure inlets 100 to a cylinder 101 to move a piston-rod carrying a die 102 into engagement with one side of the rail. The other side of the rail is in engagement with a fixed die 103. When the rail has been gripped between clamps 102 and 103, fluid under pressure is designed to pass by way of a by-pass 104 into a cylinder 105 to cause a piston-rod 106 to be forced downwardly to operate a toggle 107, 108, the latter member carrying a die or clamp 110 adapted to engage the same side of the rail as clamp 102, but with much greater force. The clamp 102 is only for the purpose of positioning the rail, but the clamp 110, coacting with the extension of fixed die 103, is for the purpose of gripping the rail so firmly that the said rail will not slip when the rails are moved into butting engagement for the purpose of forming the weld. After the piston within cylinder 105 is moved past an outlet 111, fluid under pressure is permitted to move through a by-pass 112 into a cylinder 113 to cause a piston rod 114 to be moved outwardly and operate a lever 116, the other of which carries a contact pad 117 adapted to engage the top of the rail.

One of the rails which will form the weld has thus been properly positioned and firmly gripped by the gripping dies as well as firmly engaged by the electric contact 17. The operator then operates a controller (not shown here, but fully disclosed in said parent application Serial No. 169,222) to cause the rail to travel into the welding car until the left-hand end of said rail engages the right-hand end of the preceding rail. The operator then operates a valve which admits fluid under pressure to cylinders 101', 105', and 114' to cause a positioning die (not shown) similar to 102, gripping die 110', and electrode 117' to be applied to the left-hand end of the second rail in the same sequence as hereinbefore described.

The rail ends are now in position for the welding operation. The frame 121 is moved back (by mechanism described hereinafter) to separate the rail ends and the operator closes the energizing circuit. Then the frame 121 is moved so as to bring the rail ends in contact to cause the current to pass through the adjacent ends of the rail. In this operation, metal will be burned away from the adjacent ends of the rails and it is necessary to feed up the right-hand rail as the said metal burns away. Also, in order to prevent sticking of the ends with consequent drop of voltage which will impair the flashing operation, it is necessary at times to move the right-hand rail away from the left-hand rail momentarily and then continue the feeding up of the rail as the metal flashes away. For these purposes, the main casting 92 of the welding machine is provided with guides 120 upon which frame 121 may slide. Upon the said main casting 92 there are mounted push-up cylinders 125 having piston-rods 126 to which the cylinders 101', 105', 114' and their accompanying mechanism are connected so that they move therewith. Fluid under pressure supplied to the push-up cylinders may therefore move the pistons 126 to the right or left to cause the right-hand rail to be moved toward or away from the left-hand rail in the feeding operation described above. For controlling the supply of fluid under pressure there may be provided a four-way valve (not shown here, but fully disclosed in said parent application Serial No. 169,222) in the oil pressure pipeline. The right-hand rail is continuously fed up to the left-hand rail as the flashing continues, with an occasional retraction of the right-hand rail until the ends of the rail are ready for welding, whereupon the four-way valve is actuated to cause the push-up cylinders to move the right-hand rail firmly into engagement with the left-hand rail to effect the weld. The gripping members 110 and 110' hold the rails firmly against axial movement during the push-up operation when relatively great forces are present which would otherwise tend to cause the rail to slip. When the weld has been completed, all of the clamps 101', 110' and 117' are released and the four-way valve is operated by the operator for admitting fluid under pressure into the push-up cylinders 125 to cause the pistons 126 and the entire mechanism supported thereby, including frame 121, the cylinders 101', 105', 114' to be moved forward as a unit relative to the weld, which remains gripped in position by the gripping members 102, 110, 117. The forward plate 150 of the said moving frame is provided with a cutting edge (not shown here, but fully disclosed in said parent application Serial No. 169,222) positioned so that as the frame-work moves forward, the said cutting edge will shear the bottom portion of the bead or flash from the weld. If desired, similar shearing mechanism may be provided to shear other parts, or all, of the bead or flash during the same operation. After this has been performed, the push-up cylinders 125 may be controlled to withdraw the framework to original position. Thereupon the clamps 102, 110 and 117 are released and the welded rail is ready to be withdrawn from the welding machine and moved along toward the storage cars.

Figure 2:
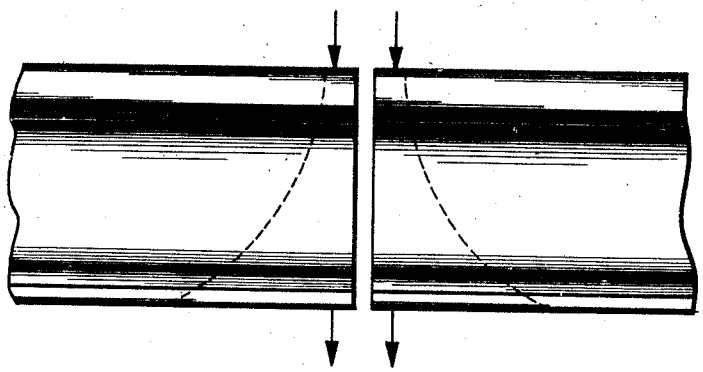
Figs. 2, 3 and 4 are largely diagrammatic, illustrating the theory of current distribution.
Figure 3:
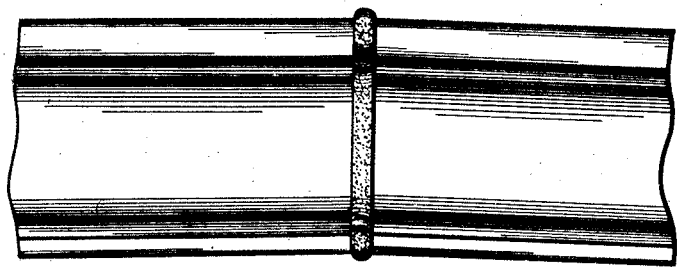
Figure 4:
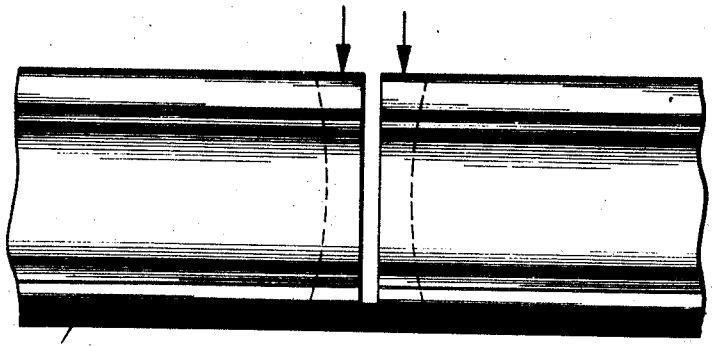

Referring to Figs. 2, 3 and 4, there is illustrated the theory underlying a novel feature of our invention. Referring first to Fig. 2, it will be seen that if alternating current is passed through the rail from top to bottom, there is a tendency for the current to spread out along the curved dotted line shown, resulting in a greater concentration of current near the base than at the head by reason of the fact that the web and base present a much larger area than the head. Therefore, when the weld is formed by butting the ends together, it is found that the web and base yield more readily than the head and there results a push-up or camber effect, as shown in Fig. 3. This is undesirable and is avoided in our invention by reason of the fact that current is not sent vertically through the rails but is confined substantially to the upper portion of the rails. For this purpose, we insulate the base of the rail by insulation 143' provided in the base-plates 143 so that current cannot pass through the rail vertically. Therefore the current is confined mainly to a path from current clamp 117 through the head of one rail to the head of the next rail and out by way of current clamp 117'. By insulating the base of the rails, therefore, the current path is confined mainly to the head of the rail but will tend to spread through the web and base and by reason of the greater area of the web and base there will result a substantially uniform current distribution, as indicated by the vertical dotted lines in Fig. 4. Therefore, when the butting operation takes place to form the weld, all parts of the rail cross-section will yield substantially equally and no push-up or camber effect will result.

While the rails are held in welding position on bed-plates 143, it has nevertheless been found to be the case that the cross sections of the rails vary to such extent that considerable time must be consumed in adjusting the positions of the rail ends by shims or similar means in order that the rail ends shall be in alignment when the weld has been formed. This, however, is a time-consuming operation and considerably cuts down the efficiency of the welding operation and increases the cost. Therefore we have worked out the following method for feeding rails into the machine, which will not require the use of shims or any loss of time in adjusting the rails so that the sections meet and are aligned when welded. We have accomplished this result by seeing that the rails are so positioned on the rack car that when fed into the welding car and the welding mechanism, all of the rails are positioned with the "brand" side adjacent the fixed dies 103. Since the base of the rail and the web surface on which the brand appears are formed by one roll in the mill, it follows that the location as regards angularity and displacement of these surfaces relative to each other is more accurate than the location of the opposite side of the web with respect to the base, because the latter side is formed by a roller whose position with respect to the base can be varied. Since alignment is determined vertically from the bases and laterally from the web, it follows that for most accurate alignment we must locate the rail laterally from that side which was rolled by the roller which forms both the web and said side, and we must therefore feed the rails into the machine so that said side is adjacent to the fixed dies 103. Therefore, if the rails are placed with the side which was rolled simultaneously with the base by the same roller always in engagement with the fixed dies, it is found that there is much less tendency toward disalignment and that after the welds are formed there is no appreciable disalignment.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. The method of welding rails in a machine having a fixed die, which consists in similarly positioning all of the rails prior to the welding operation so that the side thereof which was rolled simultaneously with the base by the same roller is positioned in every case on the same side as the fixed die, and welding adjacent rails.

2. The method of welding rails which are adapted to be supported end to end on a base, which consists in passing current into one rail and out of the other rail for heating the ends thereof to welding temperature, and insulating said rails from said base.

3. The method of welding rails which are adapted to be supported end to end on a base, which consists in passing current into one rail and out of the other rail for heating the ends thereof to welding temperature, insulating said rails from said base, separating the rail ends to form an arc, and moving the rail ends together to form the weld.

4. The method of welding rails which are adapted to be supported end to end on a base, which consists in passing current into the heads of the rails for heating the ends to welding temperature, and insulating the base of the rails from the supporting base.

5. The method of welding rails which are adapted to be supported end to end on a base, which consists in applying current clamps to the heads of the rails, passing current through said rails for heating the ends to welding temperature, insulating the base of the rails from the supporting base, separating the rail ends to form an arc, and moving the rail ends together to form the weld.

GEORGE LESTER JONES.
CHARLES B. ROEDE.